Nov. 24, 1959  W. E. BELLER  2,914,288
SPRING CLIP MEANS
Filed Dec. 22, 1955

INVENTOR.
Wilbert E. Beller
BY Nathan N. Kraus
Frank H. Marks
ATTORNEYS

United States Patent Office 2,914,288
Patented Nov. 24, 1959

2,914,288

SPRING CLIP MEANS

Wilbert E. Beller, Park Ridge, Ill., assignor, by mesne assignments, to Controls Company of America, Schiller Park, Ill., a corporation of Delaware Application December 22, 1955, Serial No. 554,665

3 Claims. (Cl. 248—361)

My invention relates to improvements in spring clip means for securing certain types of component parts in assembled relation.

One of the objects of my invention is the provision of a formed wire spring clip which affords snap-on engagement and disengagement for removably securing certain types of component parts in assembled relation.

Another object of my invention is the provision of a clip of the foregoing character which is simple in construction, efficient in operation and durable in service.

Other and further objects and advantages of my invention will become apparent from the following description when considered in connection with the accompanying drawings, in which:

Fig. 1 is a side elevational view of the same.

My invention is particularly well adapted for use in a great many types of applications requiring detachable securement of component parts of an assembly. However, the advantages are particularly evident when considered in connection with a solenoid-operated valve. For this reason such a valve has been selected as a representative embodiment.

Figures 1, 2:
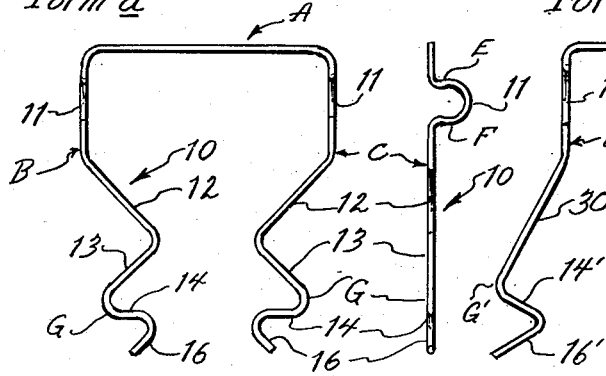
Fig. 1 is a front elevational view of a spring clip showing one embodiment of my invention.
Fig. 2 is a side elevational view of the same.

Referring to Figs. 1 and 2 the spring clip 10 of my invention is formed of a single section of spring wire of any suitable cross-section and shaped to a generally inverted U-shaped configuration. The said clip includes a transverse section A and a pair of integral legs B and C. In close proximity to the transverse section A each of the legs has formed therein an open loop or arcuately bowed portion 11 disposed in a plane at a right angle to the plane of a respective leg. Each of the legs B and C extends straight downwardly for a short distance below the open loop and is then bent alternately inwardly, then outwardly, then inwardly and finally outwardly as seen clearly in Fig. 1 forming portions 12, 13, 14 and 16, respectively. The portion 14 when in normal out-of-use position as is illustrated in Fig. 1 is substantially horizontally disposed. However, when the legs B and C are spread apart to a greater degree as when engaging a flange or lips 17 (Fig. 3) as will be hereinafter explained, the portions 14 are inclined downwardly forming, in effect, camming portions cooperating with a lip or flange of an attaching structure and facilitating ready disengagement of the legs from such lip or flange. When ready disengagement is not desired or required, the angles of the portions 14 may be varied so as to approach a horizontal line when the legs are in spread apart condition or these portions may even be inclined slightly upwardly. The outwardly flared terminal portions 16 afford camming portions adapted when the same are caused to engage a retaining lip or flange to effect spreading apart of the legs B and C, thereby facilitating application of the clip to the flange or lips of an attaching structure.

Figure 3:
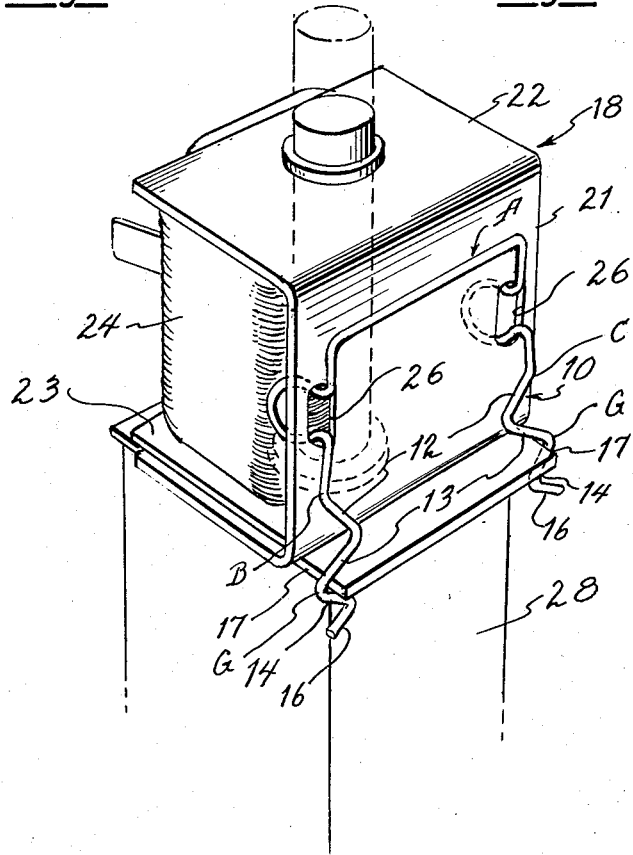
Fig. 3 is a perspective view of the spring clip illustrated in Figs. 1 and 2 and showing the same applied to component parts of a solenoid-operated valve.

As will be seen clearly by reference to Fig. 3, the spring clip 10 is intended to be attached to a removable element 18, in this instance the coil structure of a solenoid, which includes a substantially U-shaped frame with the bottom of the U constituting a side or vertical wall 21 and the legs of the frame constituting top and bottom walls 22 and 23, respectively, between which is supported the coil winding 24. The side wall 21 is provided with a pair of spaced elongated apertures 26 having a length preferably slightly less than the distance across points E—F (Fig. 2) of the loop portions so that, when said portions are pressed into the apertures 26 in the manner illustrated in Fig. 3, said portions will be in stressed condition, thereby effecting a tensioned grip in each aperture with a respective loop affording a detent to prevent inadvertent separation of the clip from the wall 21. The clip 10 is adapted to engage a flange or lip of an attaching structure, which in the present instance is a flange 17 constituting part of a housing 28 of a solenoid-operated valve. The space between the points G on legs B and C when the clip is in unstressed condition is, of course, less than the space between the edges of flange 17 so that the legs, when in engagement with the flange 17, exert pressure inwardly and serve to retain the coil element 18 against inadvertent dislodgment. It will be apparent that the leg portions 14 serve as resilient shoulders or abutments engaging the flange 17, thereby providing vertical tension which prevents relative vibration. Thus, through the use only of normal hand force the coil unit 18 may easily be pulled away from the valve housing 28 for purposes of replacement. It will also be apparent that because of the angular inclination of the terminal portions 16, legs B and C may be caused to spread apart merely by applying normal hand force to the coil unit 18. Thus, by a simple push or pull action a component such as a coil unit may be readily assembled or disassembled from an attaching structure. When assembled the component is securely held against inadvertent dislodgement and in substantially rattle-free condition.

Figures 4, 5:
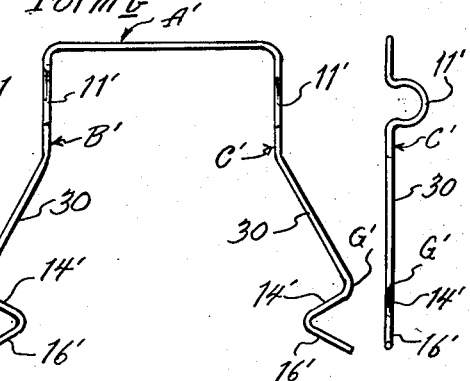
Fig. 4 is a front elevational view of a modified embodiment of my invention.

In the modified embodiment illustrated in Figs. 4 and 5, the structure is generally similar to that illustrated in Figs. 1 and 2 and primed numerals or letters are used to identify corresponding parts. The only material differences reside in the leg portions 30 which, as will be seen, diverge outwardly to provide a greater span between points G', G' so that the clip may be used on a structure having a greater width than that for which the embodiment illustrated in Figs. 1 and 2 is intended. The function is otherwise identical with that of the first described embodiment.

It will be understood that the dimensions of the clips may be varied to satisfy various requirements and conditions.

Various changes coming within the spirit of my invention may suggest themselves to those skilled in the art. Hence I do not wish to be limited to the specific embodiments shown and described or uses mentioned, but intend the same to be merely exemplary, the scope of my invention being limited only by the appended claims.

I claim:

1. In combination with a supporting structure having a pair of spaced lips and an element adapted to be removably attached to such structure, said element having a vertical wall and a pair of spaced apertures in said wall, a clip of generally U-shape configuration and formed of spring wire, each of the legs of said U being formed intermediately thereof into a partial loop disposed in a plane substantially at a right angle to said U and the terminal portion of each of said legs being formed into substantially S formation, each of said partial loops being engaged in a respective aperture in said wall to detachably secure said clip to said element, an intermediate portion of said S formation affording an abutment engaging one of said spaced lips which are in a plane perpendicular to that of sidewall 21, to detachably secure said element to said supporting structure, the terminal portions of the two legs sloping downwardly and inwardly from the base of the U and then bent to slope downwardly and outwardly from the base of the U to provide camming means for effectively spreading said legs to facilitate engagement and disengagement thereof with said lips.

2. A clip of generally U shaped configuration and formed of spring wire, each of the legs of said U being formed intermediately thereof into a substantially arcuate formation disposed in a plane substantially at a right angle to the plane of said U, the terminal portion of each of said legs being formed into substantially S formation.

3. A clip according to claim 2 in which the terminal portions of the two legs slope downwardly and inwardly from the base of the U and are then bent to slope downwardly and outwardly from the base of the U to provide camming means for effectively spreading said legs to facilitate engagement and disengagement thereof with a pair of lips.

References Cited in the file of this patent

UNITED STATES PATENTS

| | | |
|---|---|---|
| 756,924 | Wood | Apr. 12, 1904 |
| 1,098,141 | Welch | May 26, 1914 |
| 2,063,827 | Place | Dec. 8, 1936 |
| 2,068,932 | Quarnstrom | Jan. 26, 1937 |
| 2,326,903 | Tinnerman | Aug. 17, 1943 |
| 2,678,798 | Churchill | May 18, 1954 |

FOREIGN PATENTS

| | | |
|---|---|---|
| 14,544 | Great Britain | July 30, 1903 |